(12) United States Patent
Kim

(10) Patent No.: US 6,583,831 B2
(45) Date of Patent: Jun. 24, 2003

(54) LIQUID CRYSTAL DISPLAY DEVICE

(75) Inventor: Tae-Joon Kim, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/132,290

(22) Filed: Apr. 26, 2002

(65) Prior Publication Data

US 2002/0159001 A1 Oct. 31, 2002

(30) Foreign Application Priority Data

Apr. 26, 2001 (KR) .................................... 2001-22766

(51) Int. Cl.[7] .............................................. G02F 1/1333
(52) U.S. Cl. ......................................... 349/58; 349/149
(58) Field of Search ............................. 349/58, 40, 59, 349/149; 361/681

(56) References Cited

U.S. PATENT DOCUMENTS 6,175,396 B1 * 1/2001 Kim et al. ..................... 349/58

OTHER PUBLICATIONS

Pub. No. US 2002/0080298 A1, 06–2002, Fukayama.*

* cited by examiner

Primary Examiner—Robert H. Kim
Assistant Examiner—Thoi Duong
(74) Attorney, Agent, or Firm—McGuireWoods LLP; Hae-Chan Park

(57) ABSTRACT

Disclosed is a liquid crystal display device capable of preventing a grounding clip, which is combined to an end of a mold frame to ground a printed circuit board to a top chassis, from making electrical contact with a display unit. A guide projection is formed at the end of the mold frame so as to be placed adjacent to the grounding clip. A gap between the guide projection and the liquid crystal display panel is narrower than a gap between the liquid crystal display panel and the grounding clip. Accordingly, even though the mold frame is bent by means of an outerforce applied to both ends of the mold frame, it is possible to prevent the grounding clip from deforming and making electrical contact with the liquid crystal display panel.

12 Claims, 19 Drawing Sheets

LIQUID CRYSTAL DISPLAY DEVICE

BACKGROUND OF THE INVENTION

1. Field of the Invention

The present invention relates to a liquid crystal display device, and more particularly, to a liquid crystal display device capable of preventing a ground clip from making contact with a display unit due to a deformation of the ground clip that is combined with an end of a mold frame to ground a printed circuit board to a top chassis.

2. Description of the Related Art

Recently, an information process device such as a computer has been rapidly improved as the information technology industry has been developed. In addition, this technological development has affected an improvement of a monitor device displaying information output from the information process device.

The aforementioned monitor device generally is divided into a cathode ray tube type of monitor device, using a characteristic of a cathode ray tube, and a liquid crystal display unit type of monitor device, applying physical and optical characteristics of liquid crystals. The liquid crystal display unit type of the monitor device has characteristics of being small in size and light in weight, and less consumption power. Accordingly, the liquid crystal display unit type of the monitor device is widely used as a display device of a lap-top top computer, a monitor of a desk-top computer and a monitor of a high-quality television receiver.

FIG. 1 is an exploded perspective view schematically showing the conventional liquid crystal display device and FIG. 2 is a plan view of a position of a ground clip for grounding a printed circuit board to a top chassis of the liquid crystal display device shown in FIG. 1. Also, FIGS. 3 and 4 show a combination construction of the liquid crystal display device shown in FIG. 1.

Referring to FIG. 1, the liquid crystal display device 100 has a liquid crystal display module 130 for displaying images when image signals are applied thereto, and front case 110 and rear case 120 for receiving the liquid crystal display module 130. The liquid crystal display module 130 includes a display unit 170 having a liquid crystal display panel for showing the images and a backlight assembly 150 for supplying a light to the display unit 170.

The display unit 170 has a liquid crystal display panel 171, a data side printed circuit board 176, a gate side printed circuit board 175, a data side tape carrier package 178 and a gate side tape carrier package 174.

The liquid crystal display panel 171 includes a thin film transistor board 172, a color filter board 173 and liquid crystal (not shown).

The thin film transistor board 172 is a transparent glass board on which the thin film transistors are formed in a matrix shape. Data lines are respectively connected with source terminals of the thin film transistors and gate lines are connected with gate terminals of the thin film transistors. Furthermore, pixel electrodes are respectively formed at drain terminals of the thin film transistors, which are made of a transparent conductive material such as Indium Tin Oxide (ITO).

The color filter board 173 is provided to face towards the thin film transistor board 172. RGB pixels are formed on the color filter board 173 by means of a thin film process, which presents a predetermined color while the light passes through the color filter board 173. Common electrodes made of ITO are coated on the front surface of the color filter board 173.

When the power source is applied to the gate terminals and to the source terminals of the transistors on the thin film transistor board 172, to turn on the thin film transistors, an electric field is created between the pixel electrodes of the thin film transistor board 172 and the common electrodes of the color filter board 173. The electric field changes the array angle of liquid crystal, which is injected between the thin film transistor board 172 and the color filter board 173. This changes the transmissivity of the light and shows the desired pixel images.

Meanwhile, a driving signal and a timing signal are applied to the gate lines and to data lines of the thin film transistors in order to control the array angle of the liquid crystal and the time of arraying the liquid crystal in the liquid crystal display panel 171. As shown in FIG. 1, the data side tape carrier package 178, which is made of flexible circuit boards, is attached to the source portion of the liquid crystal display panel 171 to determine a data driving signal timing. On the other hand, the gate side tape carrier package 174 is attached to the gate portion of the liquid crystal display panel 171 for a gate driving signal timing.

The data side printed circuit board 176 and the gate side printed circuit board 175, which respectively apply the driving signal to the gate line and to the data line as soon as receiving image signals input from outside of the liquid crystal display panel 171, makes contact with the data side tape carrier package 178 for the data line and the gate side tape carrier package 174 for the gate line in the liquid crystal display panel 171, respectively. A source portion is formed on the data side printed circuit board 176 in order to receive the image signals from an information process device (not shown) such as a computer, etc. and then to provide the gate driving signal for the gate line of the liquid crystal display panel 171. Also, a gate portion is formed on the gate side printed circuit board 175 to provide the gate driving signal to the gate lines of the liquid crystal display panel 171. That is, the data side printed circuit boards 176 and the gate side printed circuit board 175 generate and apply the gate driving signal and the data signal for driving the liquid crystal display device. They also generate a plurality of timing signals for applying the gate driving signal and the data signal to the gate lines and the data lines of the liquid crystal display panel 171, so as to provide the gate driving signal through the gate side tape carrier package 174 to the gate lines of the liquid crystal display panel 171 and to supply the data signal through the data side tape carrier package 178 to the data lines of the liquid crystal display panel 176.

A backlight assembly 150 is provided under the display unit 170 to uniformly supply the light to the display unit 170. The backlight assembly 150 includes a lamp unit 160, which is disposed at an end of the liquid crystal display module 130, for generating the light, a light guide plate 152 for guiding the light emitted from the lamp unit 160 toward the display unit 170 and changing a pathway of the light, a plurality of optical sheets 153 for adjusting a brightness of the light transmitted from the light guide plate 152 uniformly and a light reflecting plate 151 that is provided under the light guide plate 152 for reflecting the light leaking from the light guide plate 152 so as to improve the efficiency of the light.

The display unit 170 and the backlight assembly 150 are supported by a mold frame 131, that receives the light reflecting plate 151 and is used as a receiving container, and a top chassis 140 is provided to prevent the display unit 171 from departing from the mold frame 131.

As shown in FIG. 2, a ground clip 133 is combined to an end of the mold frame 131 that receives the display unit 171 in order to ground the data side printed circuit board 176. The ground clip 133 electrically connects the data side printed circuit board 176 to the top chassis 140.

Referring to FIG. 3, the mold frame 131 receives the light reflecting plate 151, the light guide plate 152 and the optical sheets 153 in that order. The display unit 170 is placed on the optical sheets 153 so as to partially overlap the mold frame 131. The ground clip 133 is mounted to enclose an end of the mold frame 131. The ground clip 133 extends from an upper surface of the end of the mold frame 131 to the printed circuit board 176. A portion of the ground clip 133, which is bent to a rear surface of the mold frame 131, contacts the data side printed circuit board 176. The display unit 170 is fixed to the mold frame 131 by the top chassis 140 faced towards and combined with the mold frame 131. The top chassis 140 contacts the ground clip 133 at a side of the mold frame 131, making the top chassis 140 being electrically connected with the data side printed circuit board 176 through the ground clip 133.

However, the mold frame 131 is typically made of a resin and flexes when an outer force is applied to the mold frame 131. As shown in FIG. 4A, when the one end, on which the ground clip 133 is mounted, and the other end of the mold frame 131 are pressed by a force P, a bottom surface of the mold frame 131 is flexed as shown by a reference symbol A. This forms a gap between the mold frame 131 and the backlight assembly received in the mold frame 131. As a result, while being pushed into the mold frame 131, one end of the ground clip 133 makes contact with a ITO electrode of the color filter board 173 of the liquid crystal display panel 171. The reference numeral 172a is a polarization plate for the thin film transistor board 172, and the reference numeral 173a is a polarization plate for the color filter board 173. As shown in FIG. 4B, when the thin film transistor board 172 is formed to be longer than the color filter board 173, the ground clip 133 makes electrical contact with the liquid crystal display panel 171 as being climbed above an upper portion of the thin film transistor board 172 by the force applied to the ground clip 133. That is, while the upper portion of the ground clip 133 departs from an upper surface of the mold frame 131, the ground clip 133 makes electrical contact with the liquid crystal display panel 171 as shown by reference symbols B and C in FIGS. 4A and 4B, respectively. Accordingly, there is a problem in that the data side printed circuit board 176, the liquid crystal display panel 171, the top chassis 140 and the ground clip 133 are subjected to form an electrical short circuit.

SUMMARY OF THE INVENTION

The present invention has been made to solve the aforementioned problem, and accordingly it is an object of the present invention to provide a liquid crystal display device capable of preventing a ground clip from connecting with a display unit due to a deformation of the ground clip that is combined with an end of a mold frame to ground a printed circuit board to a top chassis.

To achieve the object of the present invention, a liquid crystal display device comprises a display unit for displaying an image, a mold frame for receiving the display unit, a printed circuit board mounted on a rear surface of the mold frame for controlling an operation of the display unit and a top chassis faced towards and combined with the mold frame for guiding a position of the display unit.

A grounding clip for grounding the printed circuit board to the top chassis is combined with an end of the mold frame. The mold frame has a projection, which is formed on an upper surface of the end of the mold frame, in order to prevent the clip from making electrical contact with the display unit. The grounding clip is disposed to enclose the end of the mold frame in such a manner of extending from the upper surface of the end of the mold frame, on which the projection is formed, to the printed circuit board. A gap between the display unit and the projection is narrower than a gap between the display unit and the grounding clip.

The mold frame further comprises a projection formed on an upper surface of the other end opposite to the one end thereof. At least one projection is formed on the upper surfaces of both ends of the mold frame. The projection fixes the display unit to the mold frame so as to prevent a movement of the display unit.

According to the liquid crystal display device of the present invention, a guide projection is formed to be adjacent to the grounding clip combined to the one end of the mold frame. A gap between the guide projection and the liquid crystal display panel is narrower than a gap between the liquid crystal display panel and the grounding clip. Accordingly, even though the mold frame flexes due to a force applied thereto, it is possible to prevent a deformation of the grounding clip. As a result, it is possible to prevent the grounding clip from connecting with the liquid crystal display panel and forming an electrical short circuit.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE PREFERRED EMBODIMENT

Hereinafter, the preferred embodiment of the present invention will be described in detail with reference to the accompanying drawings.

Figure 1:
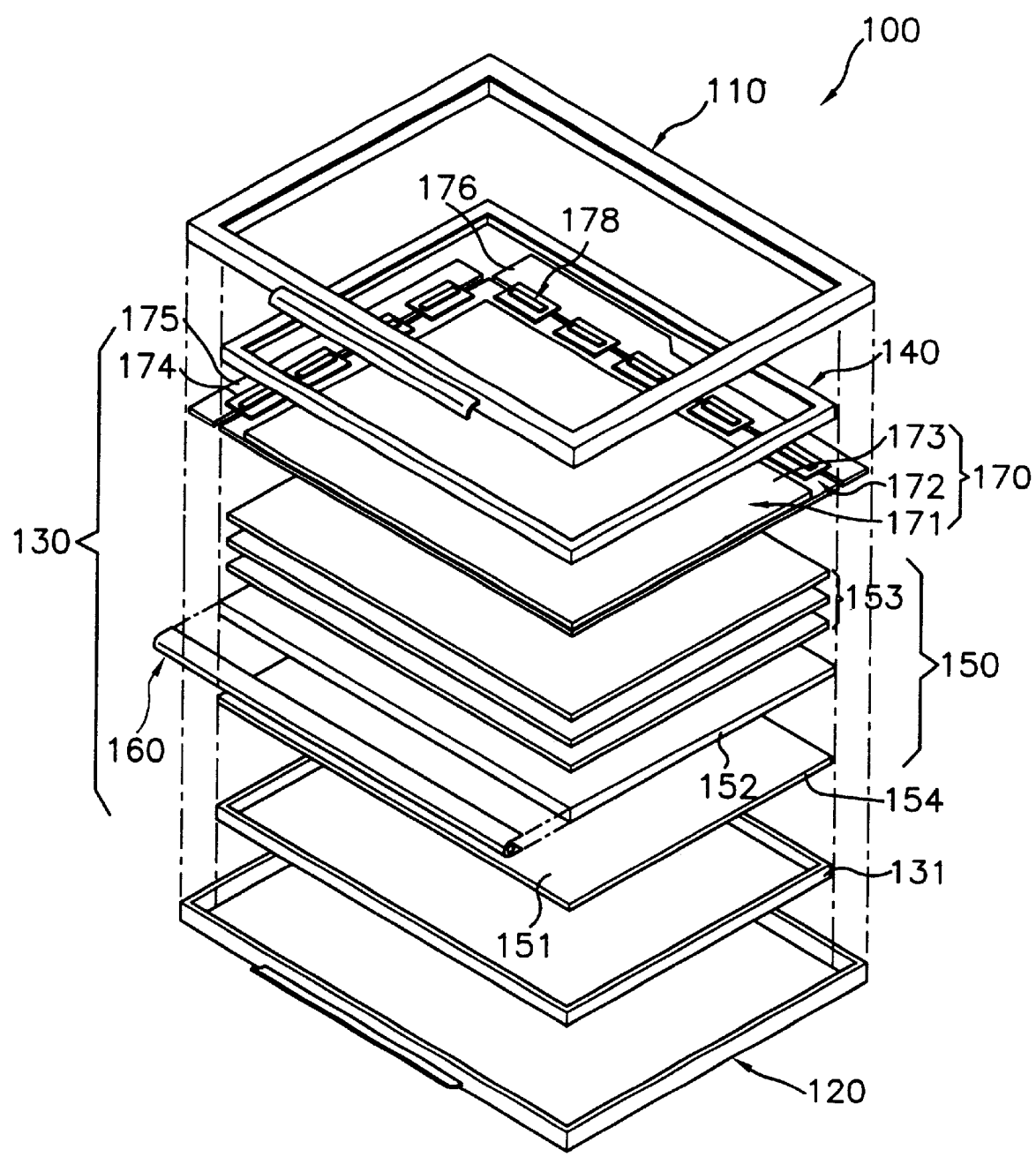
FIG. 1 is an exploded perspective view schematically showing a conventional liquid crystal display device.
Figure 2:
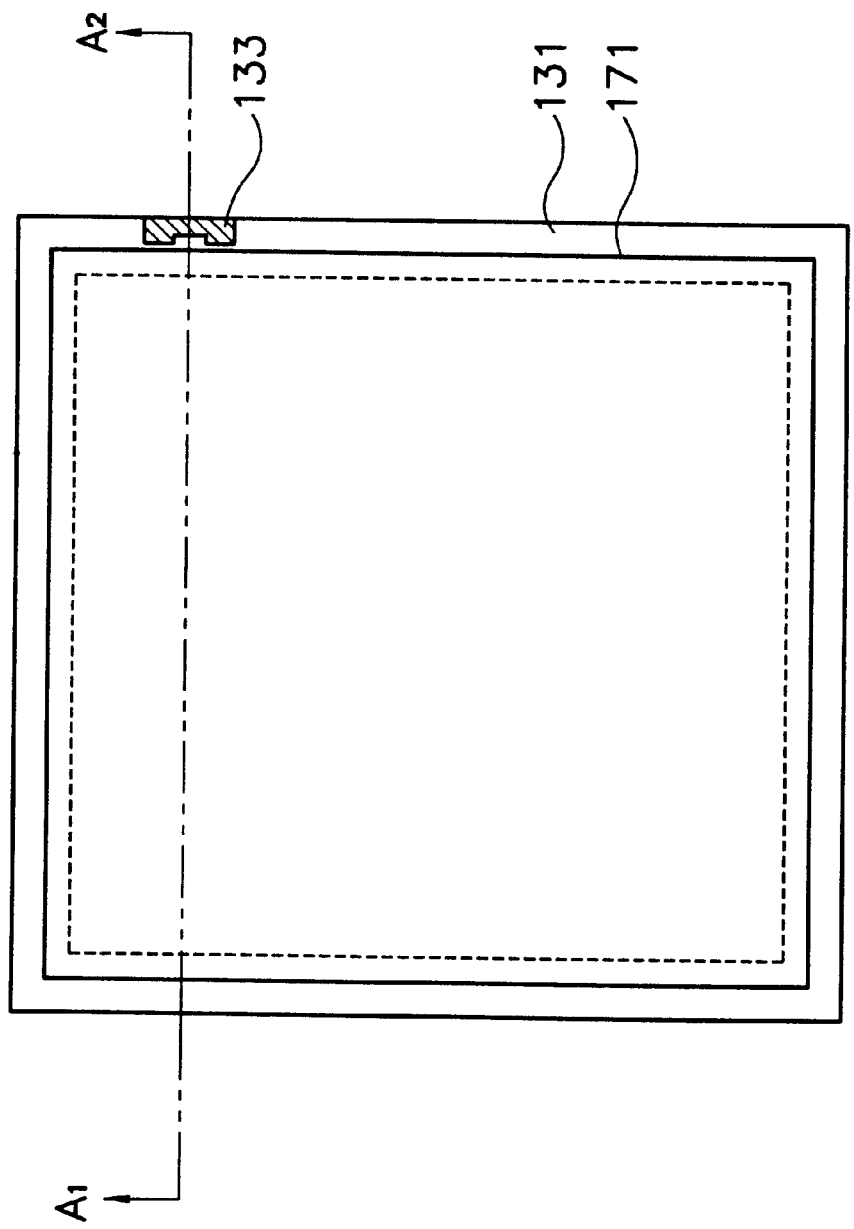
FIG. 2 is a plan view showing a position at which a grounding clip is placed so as to ground a printed circuit board to a top chassis of the liquid crystal display device shown in FIG. 1.
Figure 3:
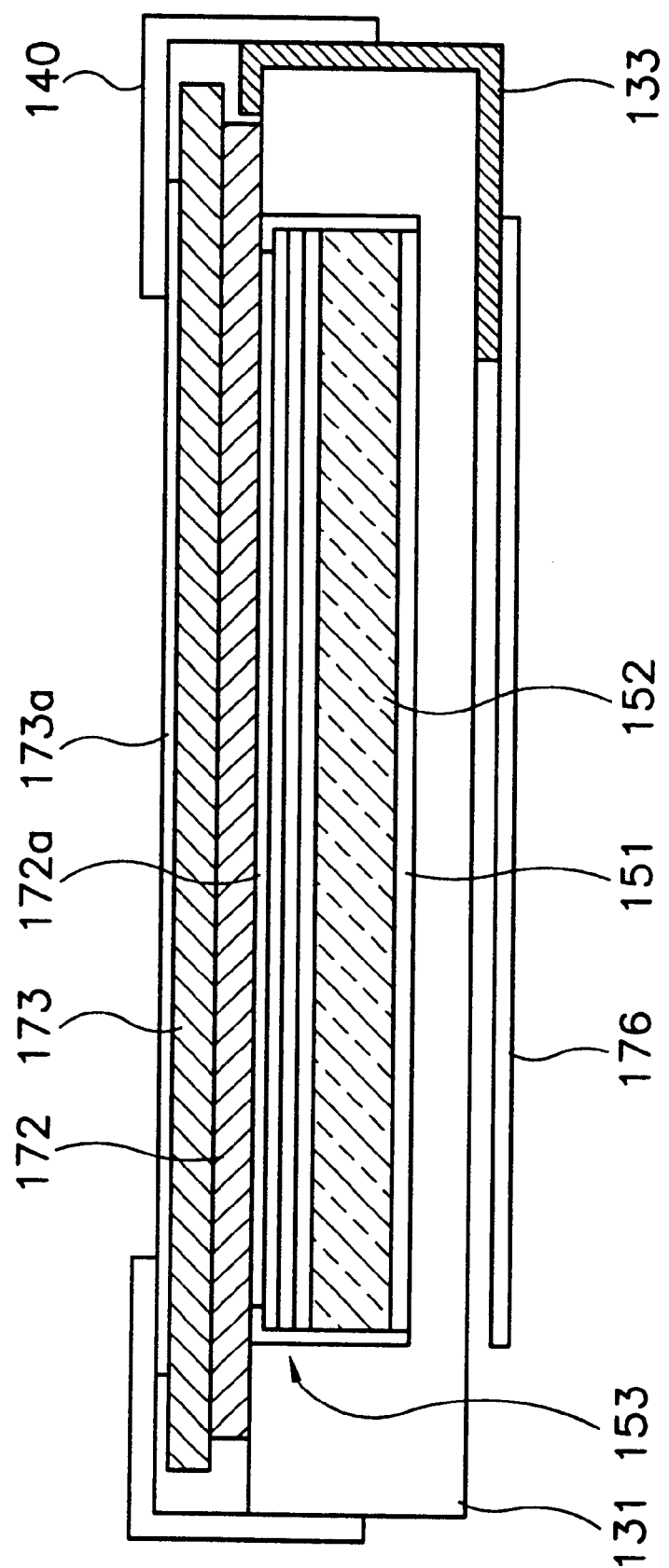
FIGS. 3, 4A and 4B are sectional views showing constructions of the liquid crystal display device shown in FIG. 1.
Figure 4A:
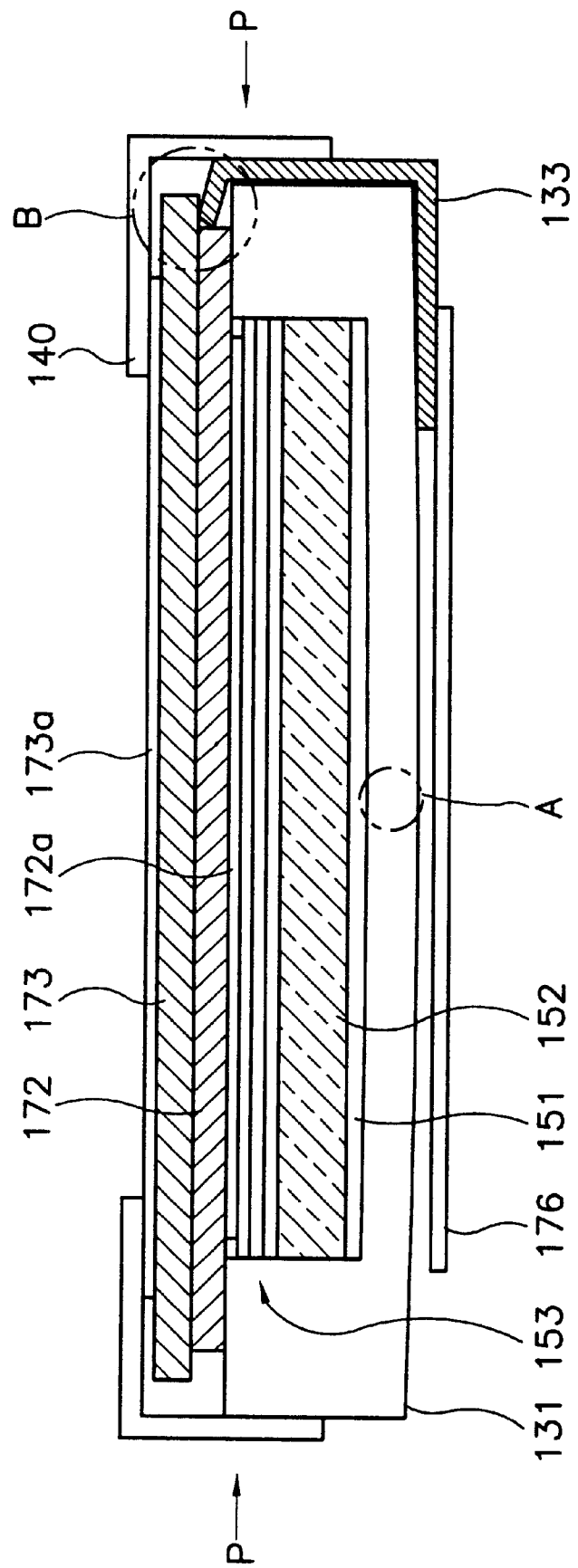
Figure 4B:
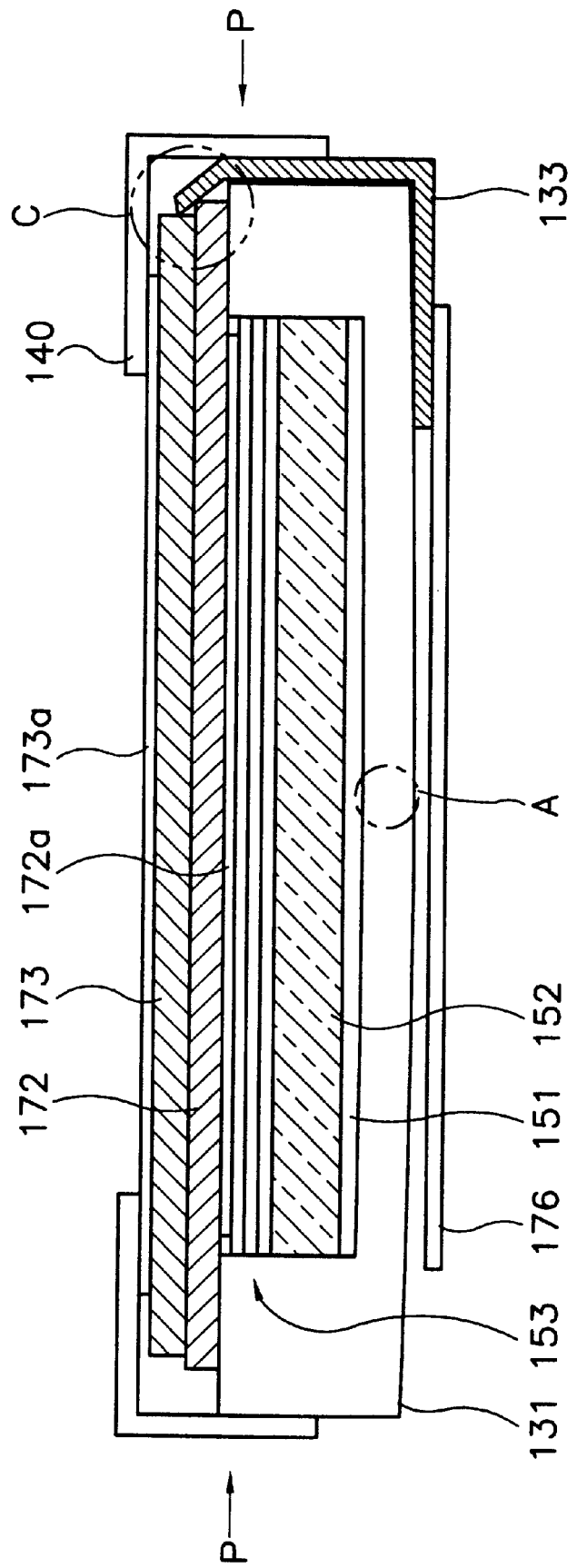
Figure 5:
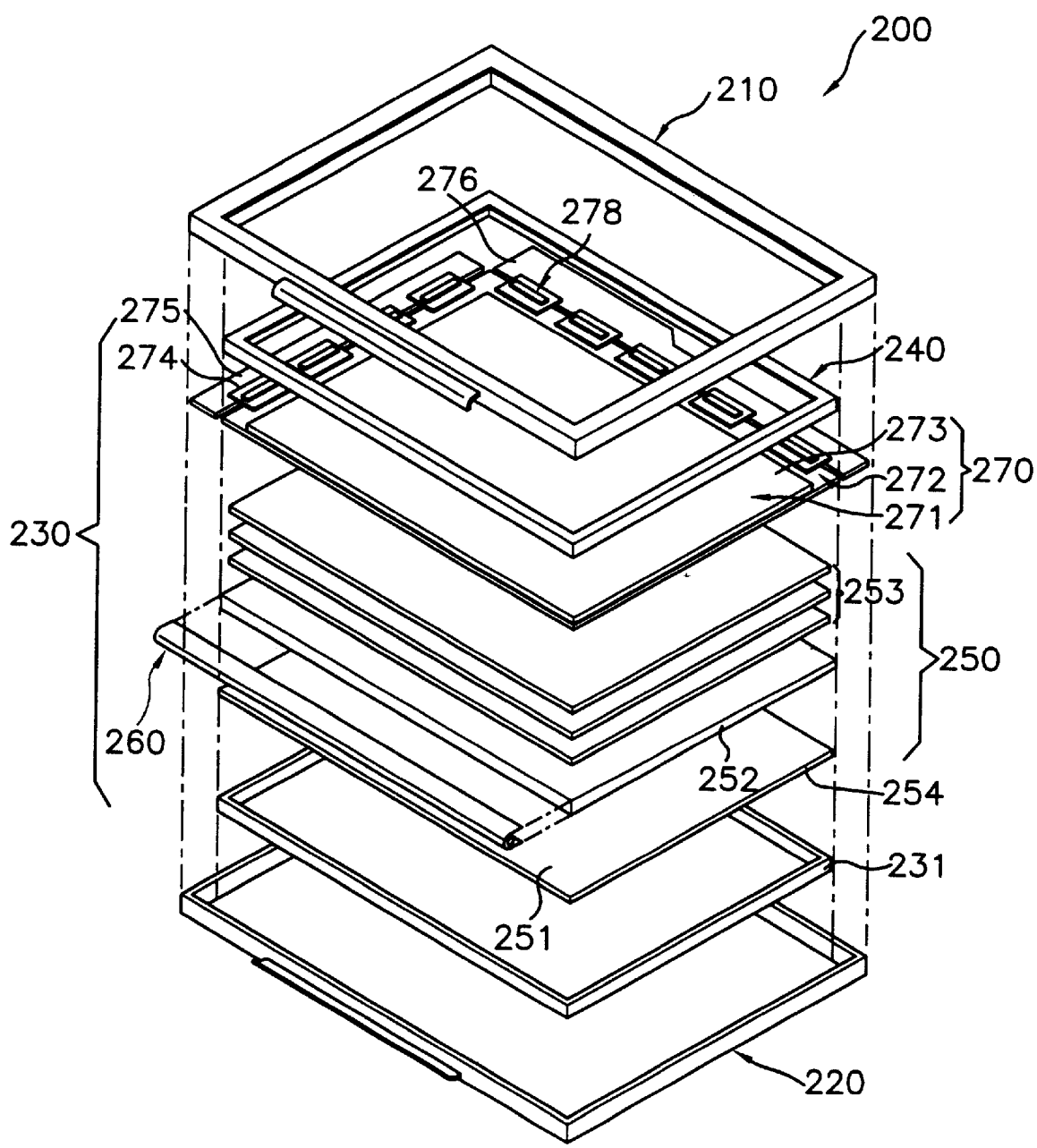
FIG. 5 is an exploded perspective view schematically showing a backlight assembly of a liquid crystal display device according to a preferred embodiment of the present invention.

FIG. 5 is an exploded perspective view schematically showing a liquid crystal display device according to a preferred embodiment of the present invention.

Referring to FIG. 5, the liquid crystal display device 200 includes a liquid crystal display module 230 for displaying images when an image signal is applied thereto and a case that has front and rear cases 210 and 220 for receiving the liquid crystal display module 230.

The liquid crystal display module 230 includes a display unit 270 having a liquid crystal display panel for displaying the images.

The display unit 270 includes the liquid crystal display panel 271, a printed circuit board 276 for a data, a tape carrier package 278 for the data, a printed circuit board 275 for a gate and a tape carrier package 274 for the gate.

The liquid crystal display panel 271 comprises a thin film transistor board 272, a color filter board 273 and liquid crystal layer there between (not shown).

The thin film transistor board 272 is a transparent glass substrate on which thin film transistors in matrix are formed. Data lines are connected with source terminals of the thin film transistors and gate lines are connected with gate terminals of the thin film transistors. Furthermore, pixel electrodes made of ITO as a transparent conductive material are formed at drain terminals of the thin film transistors.

When electric signals are applied to the data lines and to the gate lines, respectively, the electric signals are input into the source terminals and the gate terminals of the respective thin film transistors. As the electric signals are inputted into the thin film transistors, the thin film transistors are respectively turned-on or turned-off, resulting in outputting the electric signals that are required to form pixels to the drain terminals.

The color filter board 273 is provided to face towards the thin film transistor board 272. The color filter board 273 has RGB pixels that are formed by a thin film process to present desired colors when the light passes through the color filter board 273. A surface of the color filter board 273 is covered with common electrodes made of ITO.

When the power source is applied to the gate and source terminals of the transistors on the thin film transistor board 272 to turn on the thin film transistors, electric field is generated between the pixel electrodes and common electrodes of the color filter board 273. The electric field changes an array angle of the liquid crystal injected between the thin film transistor board 272 and the color filter board 273. The array angle changes control the light transmissivity and forms desired pixel images.

A driving signal and a timing signal are applied to the gate lines and the data lines of the thin film transistors in order to control the array angle of the liquid crystal and to control the time in which the liquid crystal is arranged in the liquid crystal display panel 271.

As shown in FIG. 5, the data side tape carrier package 278 that is made of flexible circuit boards, is attached to the source portion of the liquid crystal display panel 271 to decide a time of applying a data driving signal. On the other hand, the gate side tape carrier package 274 is attached to the gate portion of the liquid crystal display panel 271 to decide a time of applying a gate driving signal.

The data side printed circuit boards 276 and gate side printed circuit board 275, which respectively apply the driving signal to the gate lines and the data lines as soon as receiving image signals inputted from outside of the liquid crystal display panel 271, contact the data side tape carrier package 276 for the data line and the gate side tape carrier package 274 for the gate line in the liquid crystal display panel 271, respectively.

A source portion is formed on the data side printed circuit board 276 in order to receive the image signals from an information process device (not shown) such as a computer, etc. and then to provide the data driving signal for the data line of the liquid crystal display panel 271. A gate portion is formed on the gate side printed circuit board 275 in order to receive the image signals from the information process device such as the computer and to provide the gate driving signals for the gate lines of the liquid crystal display panel 271.

That is, the data side printed circuit board 276 and the gate side printed circuit board 275 generate the gate driving signal and the data signal for driving the liquid crystal display device as well as a plurality of timing signals for applying the gate driving signal and the data signal on time. Then the gate driving signal goes through the gate side tape carrier package 274 to the gate lines of the liquid crystal display panel 271 and the data signal goes through the data side tape carrier package 278 to the data lines of the liquid crystal display panel 271.

A backlight assembly 250 is disposed under the display unit 270 to uniformly supply the light to the display unit 270. The backlight assembly 250 includes a lamp unit 260 for generating the light.

A light guide plate 252 has a size corresponding to the liquid crystal panel 271 of the display unit 270 and is disposed under the liquid crystal panel 271 so as to guide the light generated from the lamp unit 260 to the display unit 270 while changing the pathway of the light.

Meanwhile, a plurality of optical sheets 253 are disposed on the light guide plate 252 to have the light transmitted from the light guide plate 252 to the liquid crystal display panel 271 to be uniformly bright. Furthermore, a light reflecting plate 251 is provided under the light guide plate 252 in order to reflect the light leaking from the light guide plate 252 back towards the light guide plate 252, increasing the light efficiency.

The display unit 270 and the backlight assembly 250 are supported by means of a mold frame 231, that receives the light reflecting plate 251 and is used as a receiving container. A chassis 240 is disposed on the display unit 270 to prevent the display unit 270 from departing from the mold frame 231 while the data side printed circuit board 276 and the gate side printed circuit board 275 are bent towards the outside of the mold frame 231 and fixed to the rear surface of the mold frame 231.

Figure 6:
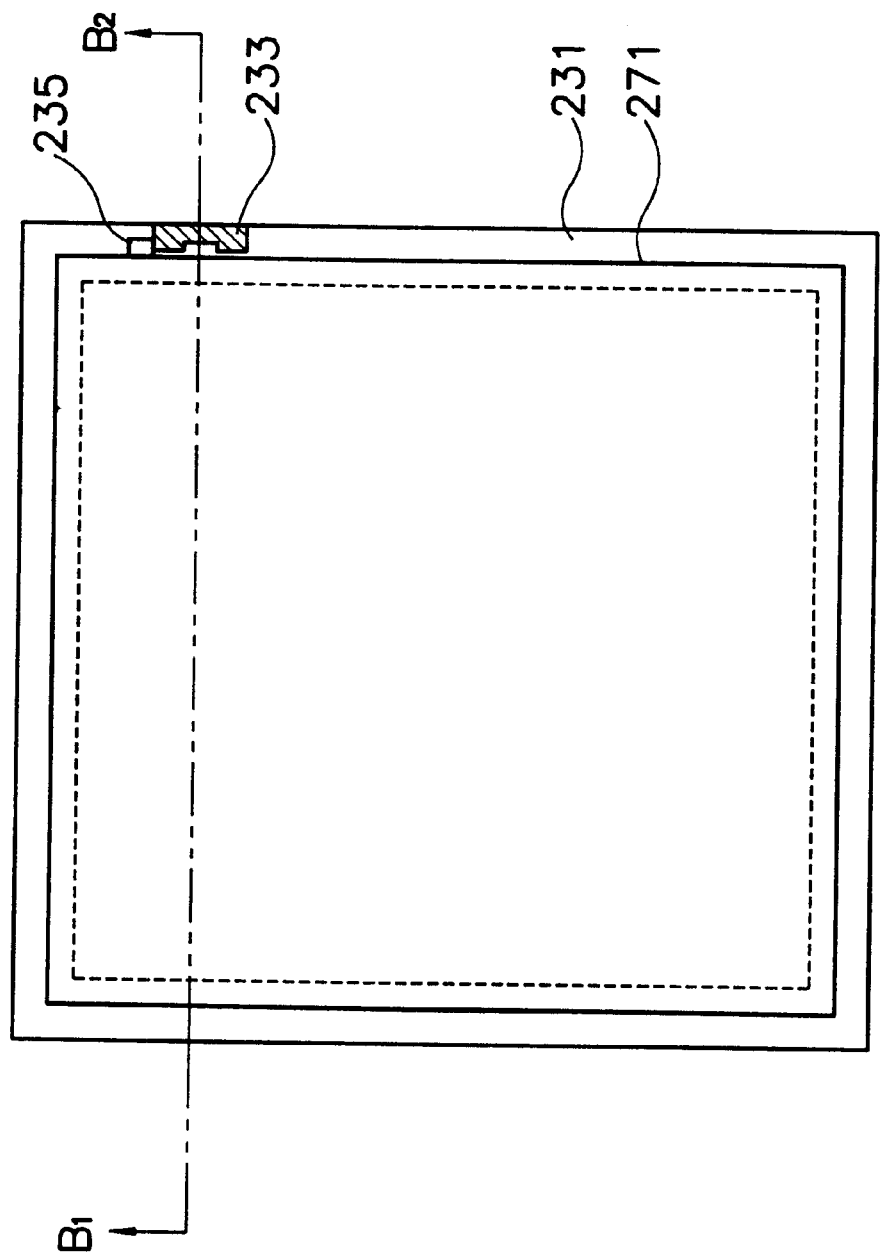
FIGS. 6, 7, 8, 9, 10, 11, 12, 13, 14, 15, 16, 17, and 18 are views showing various constructions of a mold frame for preventing a deformation of a grounding clip that grounds a printed circuit board to a top chassis in the liquid crystal display device shown in FIG. 5.
Figure 7:
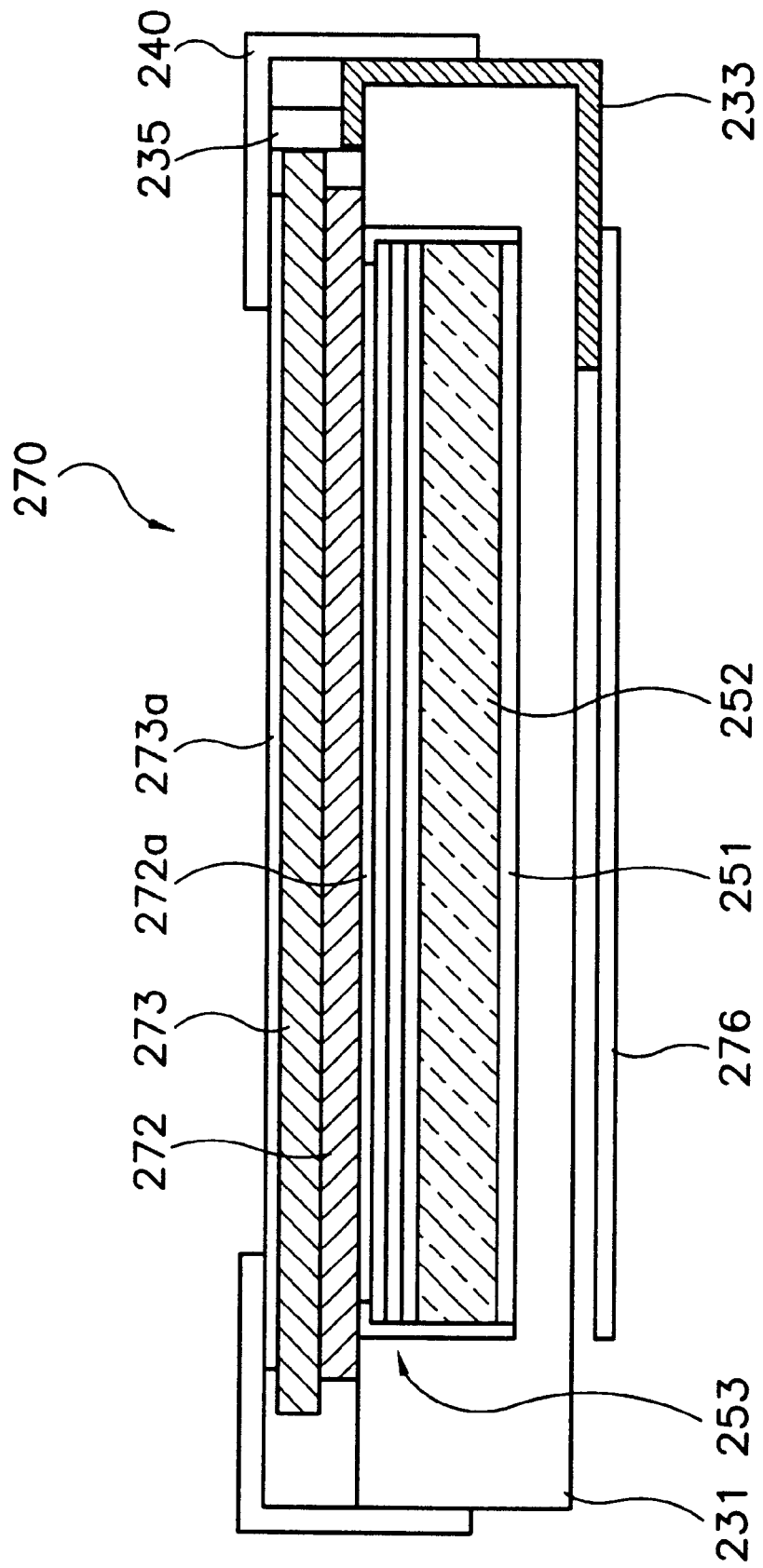
Figure 8:
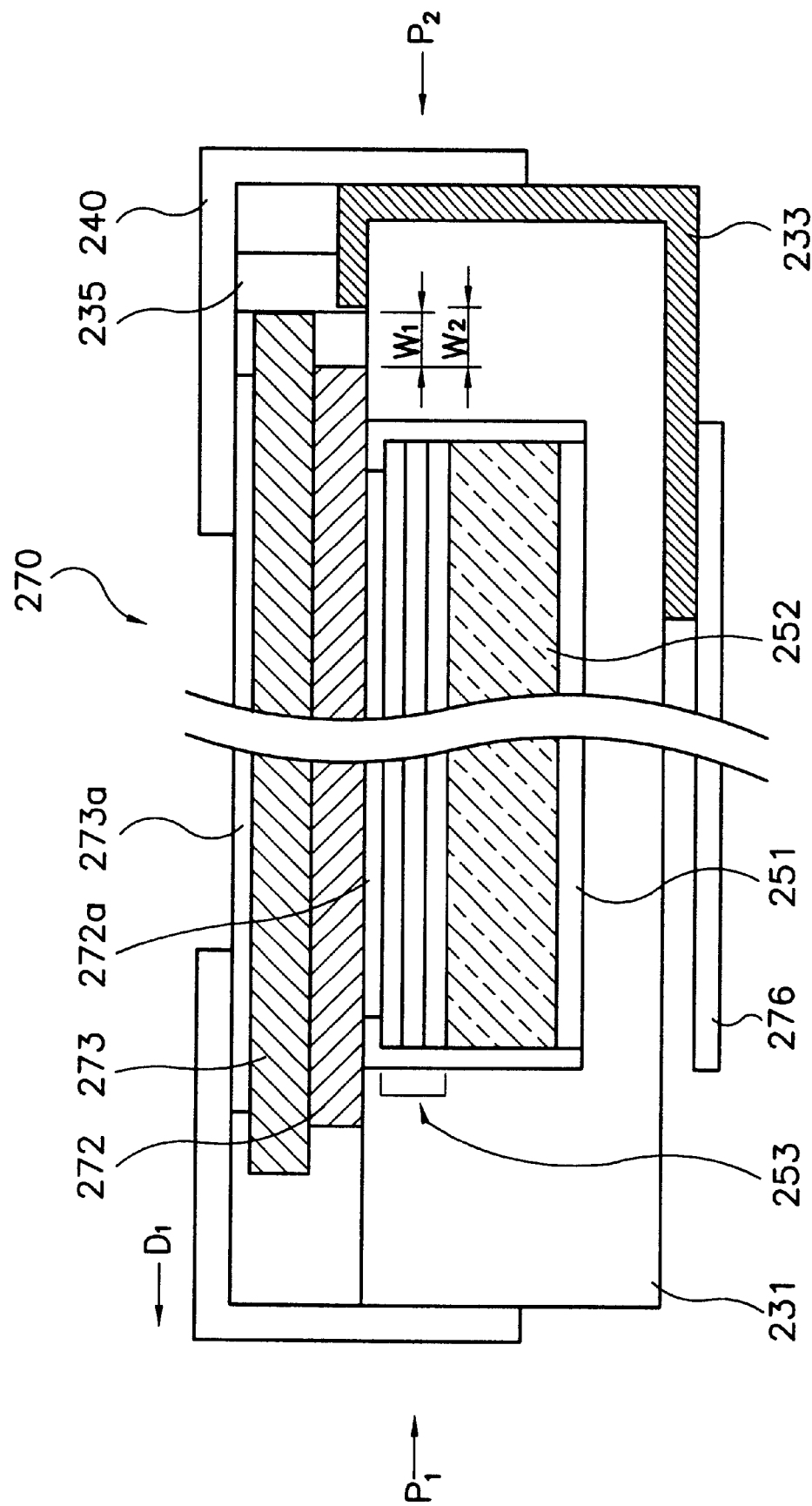
Figure 9:
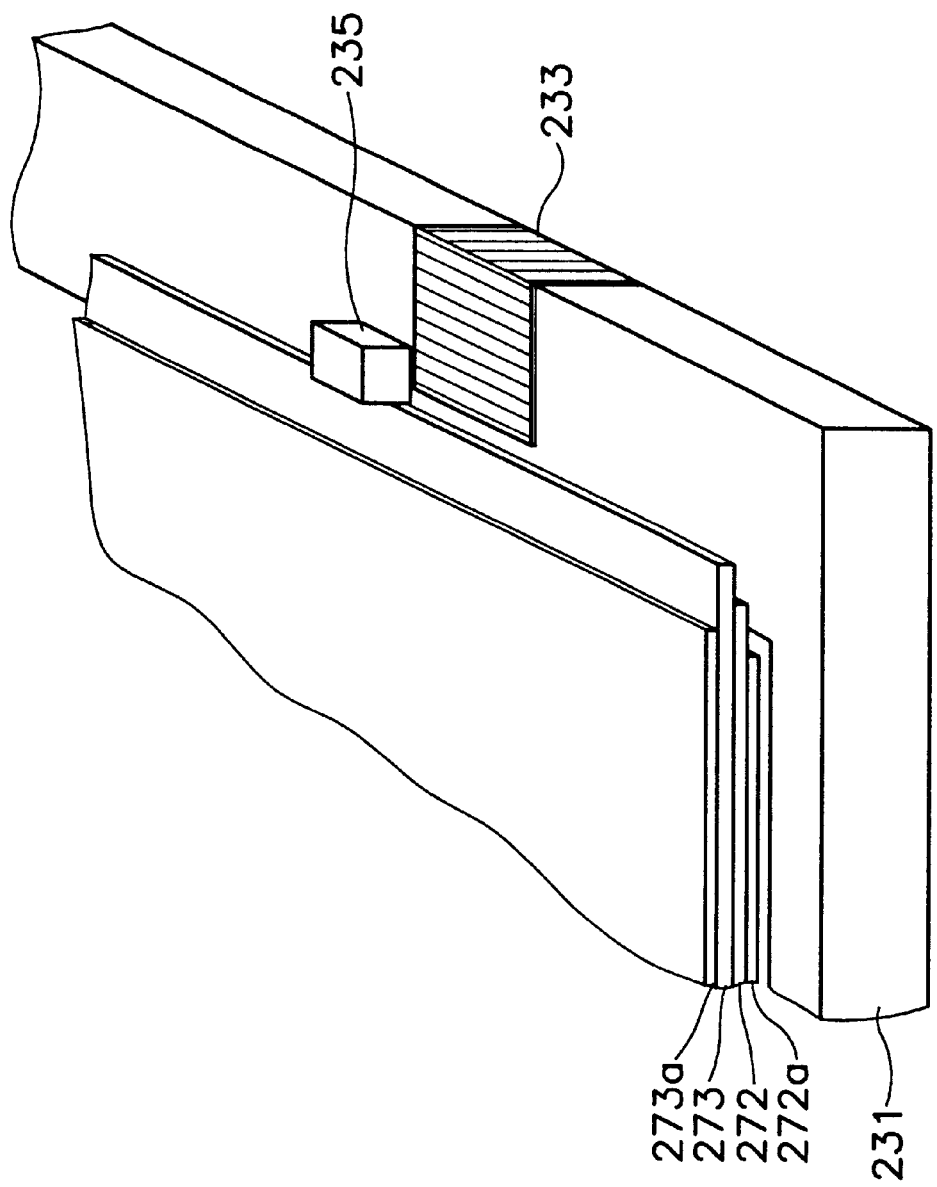

FIG. 6 is a view showing a combination construction of the mold frame and the ground clip of the liquid crystal display device according to the preferred embodiment of the present invention. FIGS. 7 and 8 are sectional views showing the liquid crystal display device, taken along the line B1-B2 in FIG. 6, and FIG. 9 is a perspective view showing a guide projection 235 and the grounding clip 233 of the liquid crystal display device shown in FIG. 6.

Firstly, referring to FIG. 6, the grounding clip 233 is combined with one end of the mold frame 231 in which the liquid crystal display panel 271 is placed, in order to ground the data side printed circuit board 276 that is bent toward and mounted on a rear surface of the mold frame 231. The guide projection 235 having a desired size is formed on the one end of the mold frame 231 to be adjacent to the grounding clip 233. At that time, the guide projection 235 makes contact with an end of the liquid crystal display panel 271 and the grounding clip 233 is spaced apart from the end of the liquid crystal display panel 271.

The preferred embodiment of the present invention will be described in more detail with reference to FIGS. 7, 8, and 9.

Referring to FIG. 7, the mold frame 231 receives the light reflecting plate 251, the light guide plate 252 and the optical sheets 253 in that order. The display unit 270 is placed on the optical sheets 253 so as to be partially overlapped with the end of the mold frame 231 and the data printed circuit board 276 is bent toward and mounted on the rear surface of the mold frame 231.

The guide projection 235 is formed on the upper surface of the end of the mold frame 231 so as to make contact with the end of the liquid crystal display panel 271, for example the color filter board 273 in the preferred embodiment. The grounding clip 233 having a shape of a letter C in a sectional view is combined with and encloses the end of the mold frame 231 to extend from the upper surface of the mold frame 231 to the data side printed circuit board 276 disposed on the rear surface of the mold frame 231. That is, the grounding clip 233 encloses one end of the mold frame 231 in such a manner of extending from the upper surface of one end of the mold frame 231 to the printed circuit board 276. The portion of the grounding clip 233 bent toward the rear surface of the mold frame 231 contacts the data side printed circuit board 276. The display unit 270 is fixed to the mold frame 231 by the top chassis 240 that is faced towards and combined with the mold frame 231. A sidewall of the top chassis 240 makes contact with the grounding clip 233 at a side of the mold frame 231 so as to be electrically connected with the data side printed circuit board 276.

If a gap between the guide projection 235 and the color filter board 273 is narrower than a gap between the color filter board 273 and one end of the ground clip 233, it does not matter if the guide projection 235 does not make contact with the color filter board 273 of the liquid crystal display panel 271.

In other word, as shown by reference symbols W1 and W2 in FIG. 8, it is preferable that the gap W1 between the guide projection 235 and the liquid crystal display panel 271 is narrower than the gap W2 between the grounding clip 233 and the liquid crystal display panel 271. The grounding clip 233, rather than the guide projection 235, may make close contact with the liquid crystal display panel 271 according to the structures of the grounding clip 233 and the guide projection 235. It will be described below with reference to the drawings.

As described above, when the guide projection 235 is adjacent to the grounding clip 233 on one end of the mold frame 231, and makes closer contact with the liquid crystal display panel 271 than when the grounding clip 233 makes contact with the liquid crystal display panel 271, it is possible to prevent the grounding clip 233 from deforming even though the mold frame 231 is bent by the force applied thereto.

In other word, when forces P1 and P2 are applied to both ends of the mold frame 231 in opposite directions, the mold frame 231 becomes bent to the extent of a gap between the mold frame 231 and the backlight assembly 250. At that time, when the forces P1 and P2 are continuously applied to the mold frame 231, the liquid crystal display panel 271 firstly makes contact with the guide projection 235 before making contact with the grounding clip 233. The liquid crystal display panel 271 is pushed toward the other end D1 of the mold frame 231, which is opposite to one end thereof, to the extent of the flexure of the mold frame 231 by a supporting force of the guide projection 235 that is integrally formed on the mold frame 231. Accordingly, the guide projection 235 can prevent the grounding clip 233 from making contact with the thin film transistor board 272 or the color filter board 273 of the liquid crystal display panel 271. As a result, the data side printed circuit board 276 is normally grounded to the top chassis 240 through the grounding clip 233. The reference numeral 272a is a polarization plate for the thin film transistor board 272, and the reference numeral 273a is a polarization plate for the color filter board 273.

Figure 10:
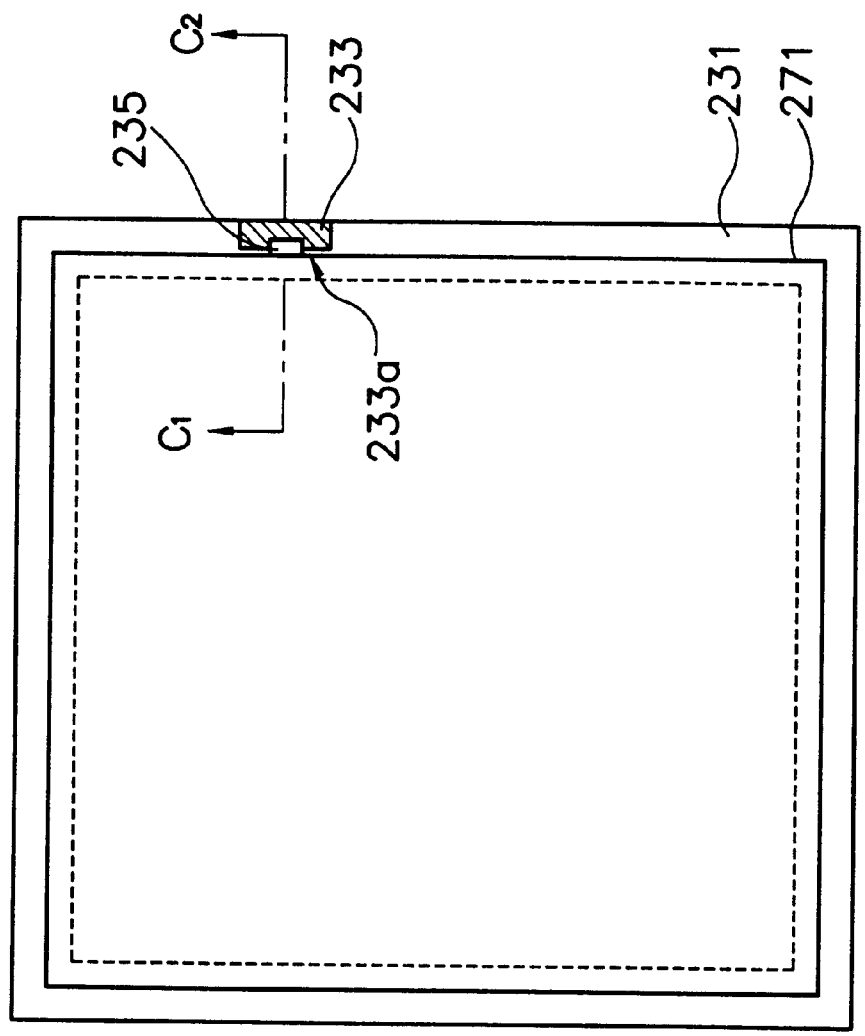
Figure 11:
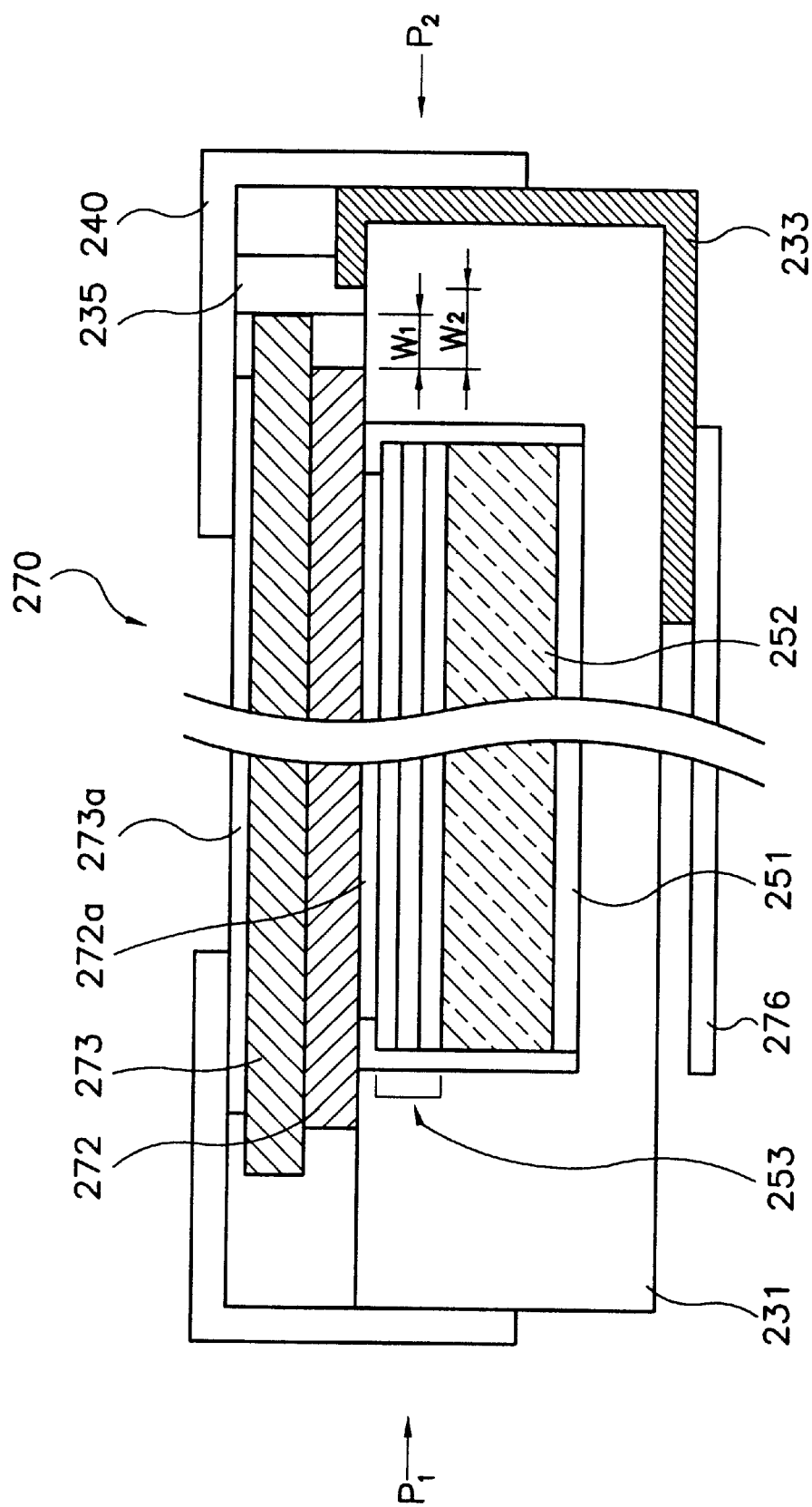
Figure 12:
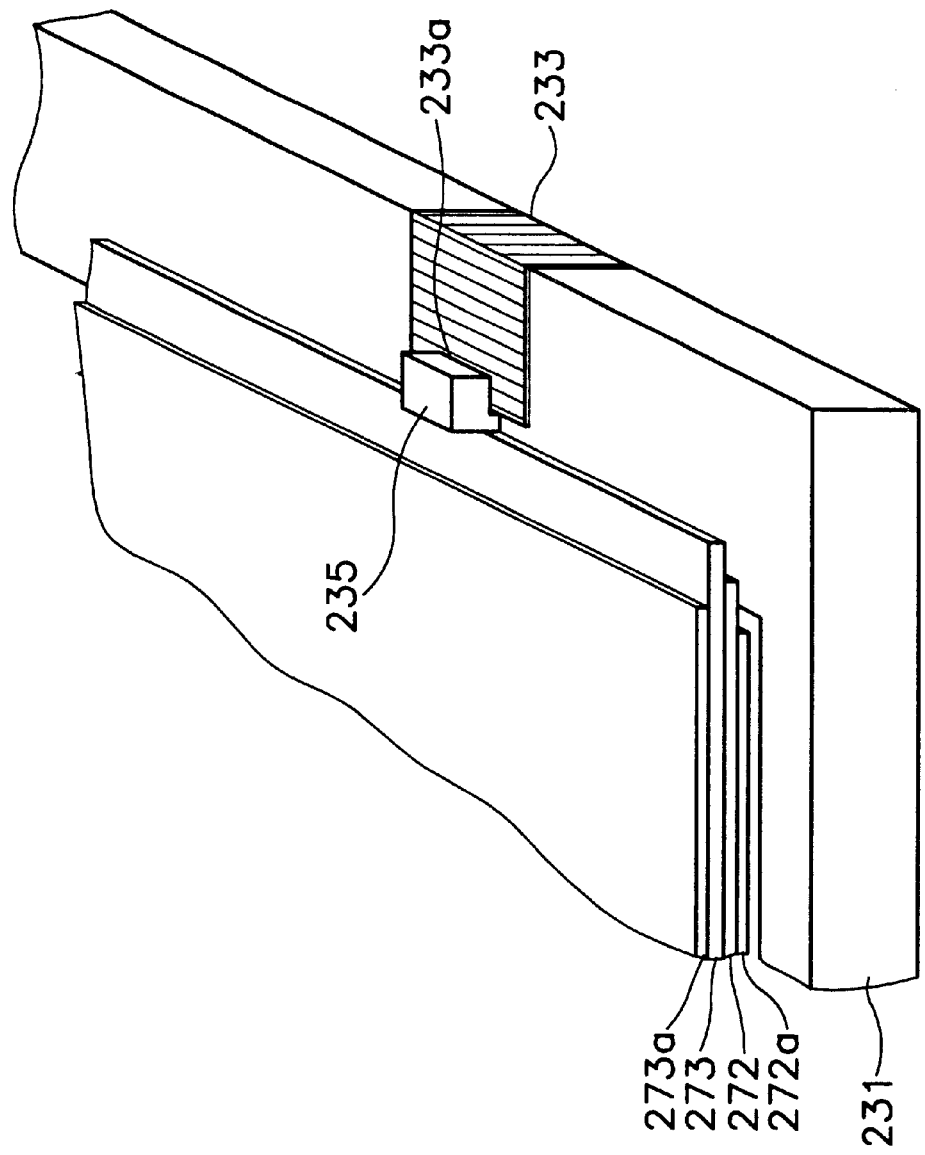

FIGS. 10, 11, and 12 are views showing combination constructions of the grounding clip 233 and the guide projection 235 shown in FIG. 9.

Referring to FIG. 10, the guide projection 235 is formed on the upper surface of one end of the mold frame 231 so as to prevent the grounding clip 233 from making contact with the liquid crystal display panel 271. The grounding clip 233 is combined with one end of the mold frame 231 so as to ground the data side printed circuit board 276 to the top chassis 240. The grounding clip 233 has a recess 233a formed at a portion corresponding to the guide projection 235 on the mold frame 231 so as to receive the guide projection 235 in the recess 233a when combined with the mold frame 231.

Referring to FIGS. 11 and 12, the mold frame 231 receives the light reflecting plate 251, the light guide plate 252 and the optical sheets 253 in sequence. The display unit 270 is placed on the optical sheets 253 so as to be partially overlapped with the end of the mold frame 231 and the data side printed circuit board 276 is bent toward and mounted on a rear surface of the mold frame 231.

The guide projection 235 formed on the upper surface of one end of the mold frame 231 is received in the recess 233a (see FIG. 12) of the grounding clip 233, when the grounding clip 233, having a shape of a letter C in a sectional view, is combined with the one end of the mold frame 231. The grounding clip 233 encloses one end of the mold frame 231 to extend from the upper surface of one end of the mold frame 231 to the data side printed circuit board 276. The portion of the grounding clip 233 bent toward the rear surface of the mold frame 231 contacts the data side printed circuit board 276.

As shown by reference symbols W1 and W2 in FIG. 11, it is preferable that the gap W1 between the guide projection 235 and the liquid crystal display panel 271 is narrower than the gap W2 between the grounding clip 233 and the liquid crystal display panel 271.

As described above, after the grounding clip 233 is combined with the mold frame 231 so that the guide projection 235 is received in the recess 233a of the grounding clip 233, the mold frame 231 is bent when forces P1 and P2 are applied to both ends of the mold frame 231 in opposite directions. At that time, since the guide projection 235 is received in the recess 233a of the grounding clip 233, the liquid crystal display panel 271 does not make physical contact with the grounding clip 233 by a supporting force of the guide projection 235 even though the mold frame 231 significantly becomes bent by means of the forces P1 and P2. Accordingly, the guide projection 235 can prevent the grounding clip 233 from contacting the thin film transistor board 272 or the color filter board 273 of the liquid crystal display panel 271. As a result, the data side printed circuit board 276 is normally grounded to the top chassis 240 through the grounding clip 233.

Figure 13:
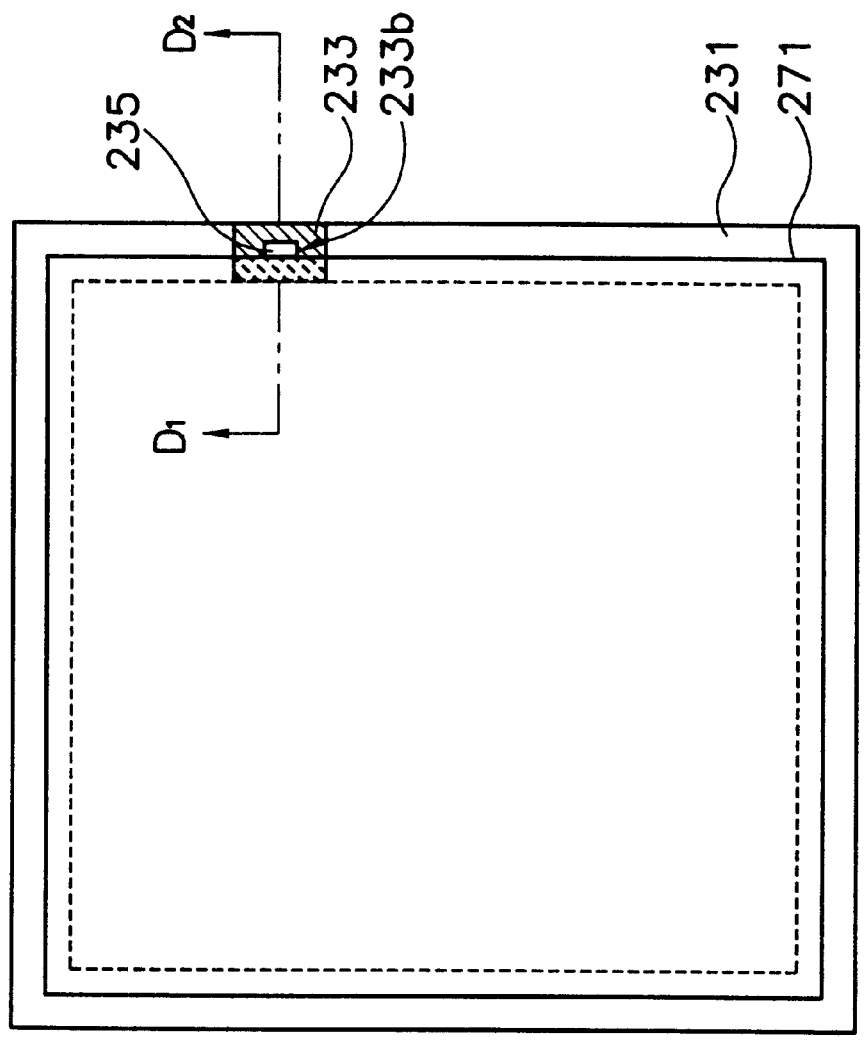
Figure 14:
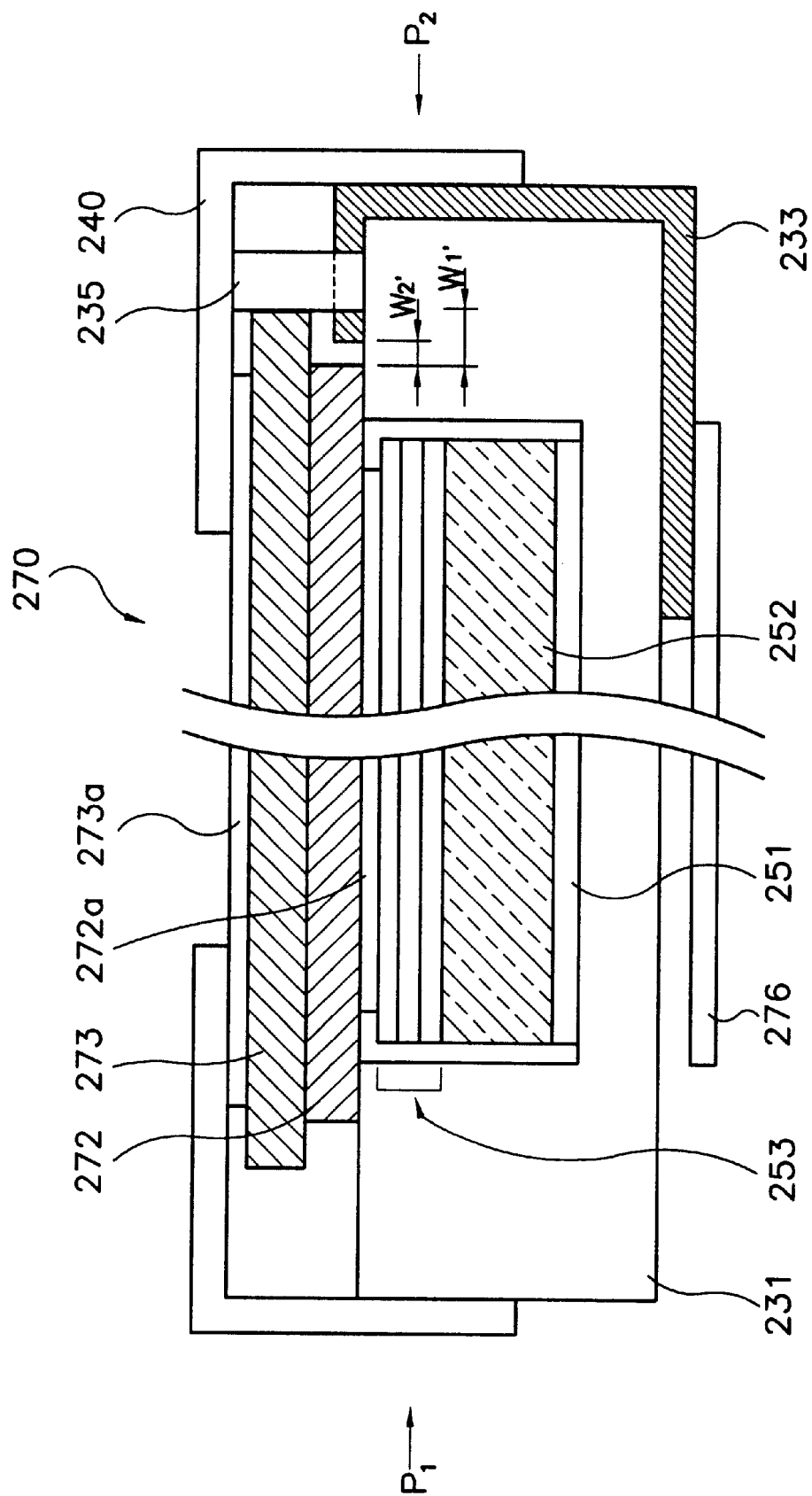
Figure 15:
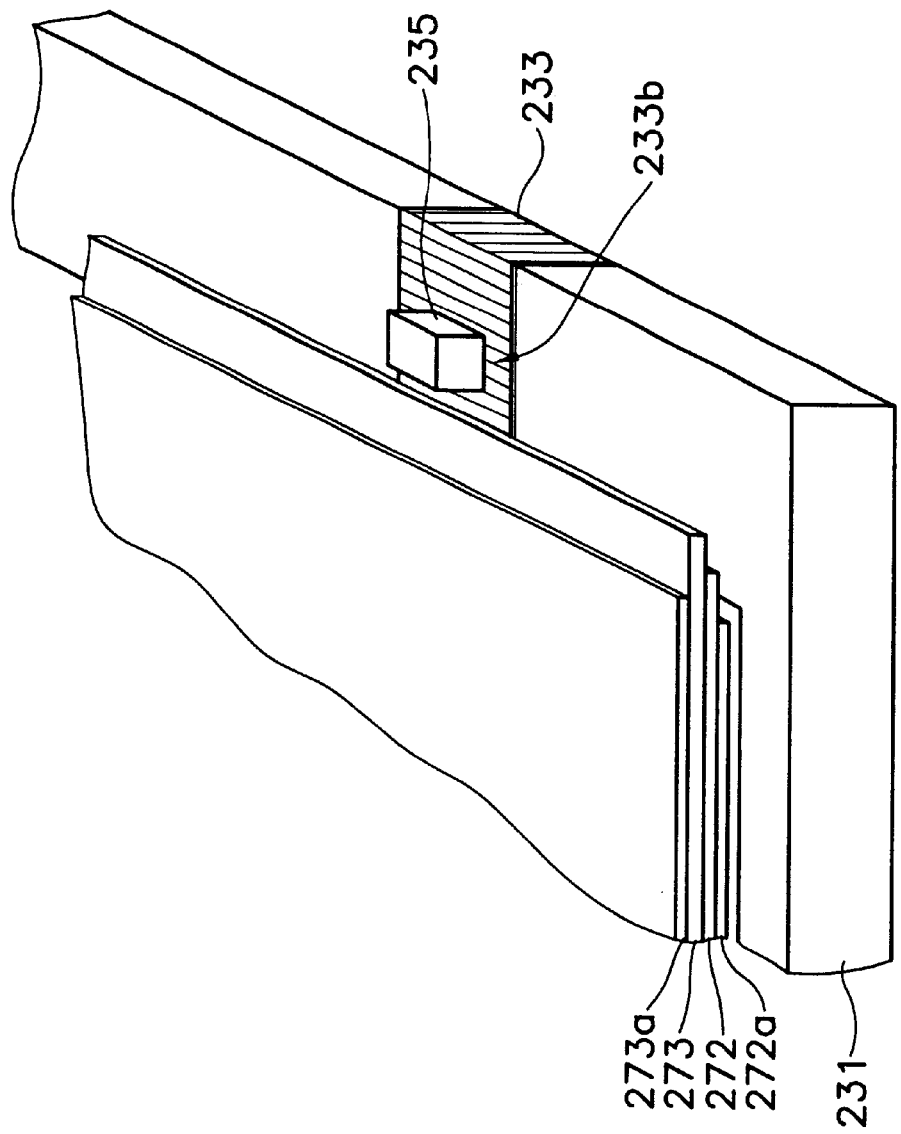

FIGS. 13, 14, and 15 are views showing other constructions of the grounding clip 233 and the guide projection 235 shown in FIG. 9.

Referring to FIG. 13, the guide projection 235 is formed on the upper surface of one end of the mold frame 231 so as to prevent the grounding clip 233 from making contact with the liquid crystal display panel 271. The grounding clip 233 is combined to one end of the mold frame 231 so as to ground the data side printed circuit board 276 to the top chassis 240. The grounding clip 233 has a thru-hole 233b formed at a portion corresponding to the guide projection 235 on the mold frame 231 so as to receive the guide projection 235 in the thru-hole 233b when the grounding clip 233 is combined to the mold frame 231.

Referring to FIGS. 14 and 15, the mold frame 231 receives the light reflecting plate 251, the light guide plate 252 and the optical sheets 253 in sequence. The display unit 270 is placed on the optical sheets 253 and the data side printed circuit board 276 is bent toward and mounted on a rear surface of the mold frame 231.

The guide projection 235 is received in the thru-hole 233*b* (See FIG. 15) of the grounding clip 233 when the grounding clip 233, having a shape of a letter C in a sectional view, is combined to one end of the mold frame 231. The grounding clip 233 is mounted on one end of the mold frame 231 so as to enclose one end of the mold frame 231 to extend from the upper surface of the one end of the mold frame 231 to the data side printed circuit board 276. The portion of the grounding clip 233 bent toward the rear surface of the mold frame 231 contacts the data side printed circuit board 276.

As shown by reference symbols W1' and W2' in FIG. 14, the gap W1' between the guide projection 235 and the liquid crystal display panel 271 is wider than the gap W2' between the grounding clip 233 and the liquid crystal display panel 271. Since the grounding clip 233 receives the guide projection 235 integrally formed on the mold frame 231 in the thru-hole 233*b* of the grounding clip 233, one end of the grounding clip 233 is partially overlapped with the liquid crystal display panel 271.

Whenever the grounding clip 233 rather than the guide projection 235, is placed to be adjacent to the liquid crystal display panel 271 as described above, since the guide projection 235 is received in the thru-hole 233*b* of the grounding clip 233, the liquid crystal display panel 271 does not make physical contact with the grounding clip 233 even though the mold frame 231 is bent by means of the forces P1 and P2 applied thereto. Accordingly, the guide projection 235 can prevent the grounding clip 233 from making any physical contact with the thin film transistor board 272 or the color filter board 273 of the liquid crystal display panel 271. As a result, the data side printed circuit board 276 is normally grounded to the top chassis 240.

Meanwhile, the guide projection 235 can be formed not only on one end but also on the other end of the mold frame 231.

Figure 16:
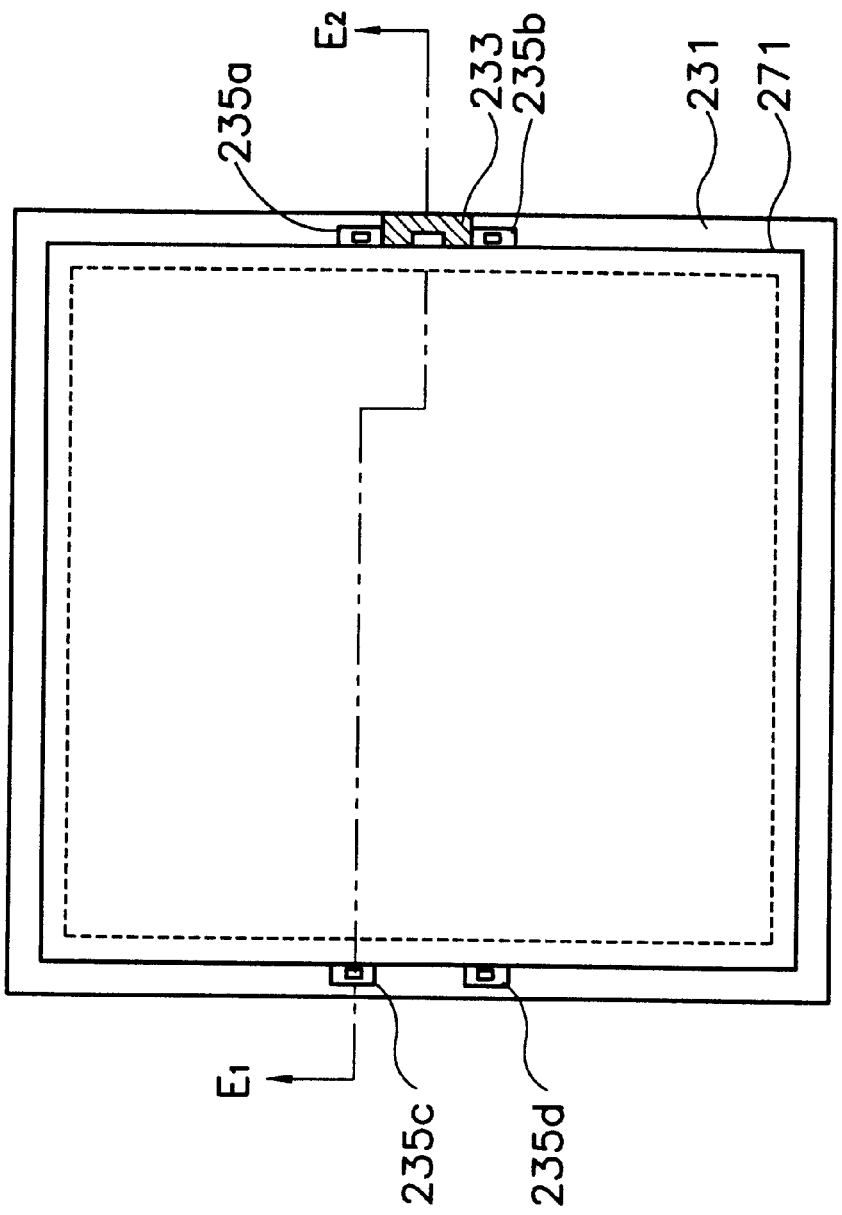
Figure 17:
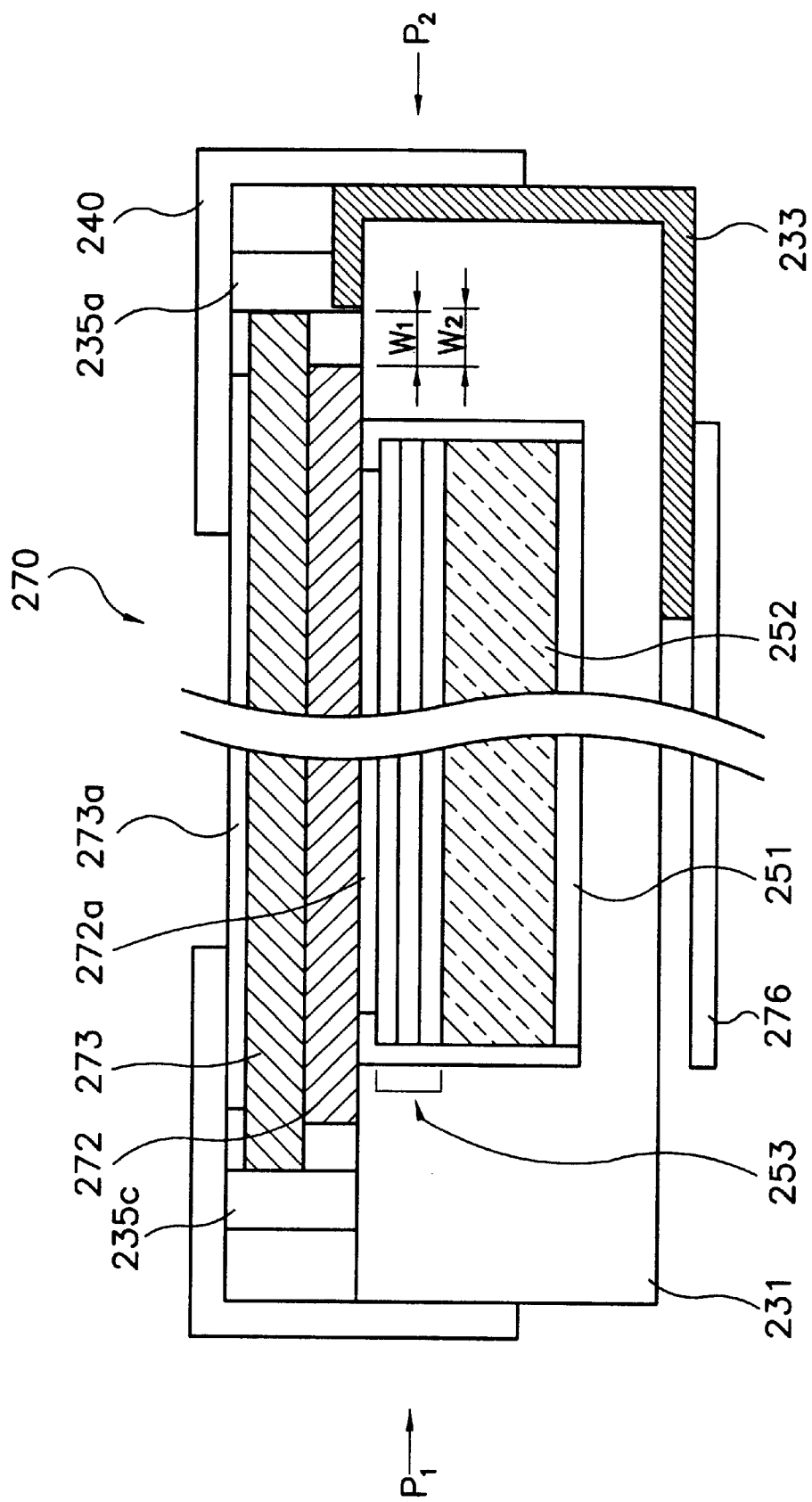
Figure 18:
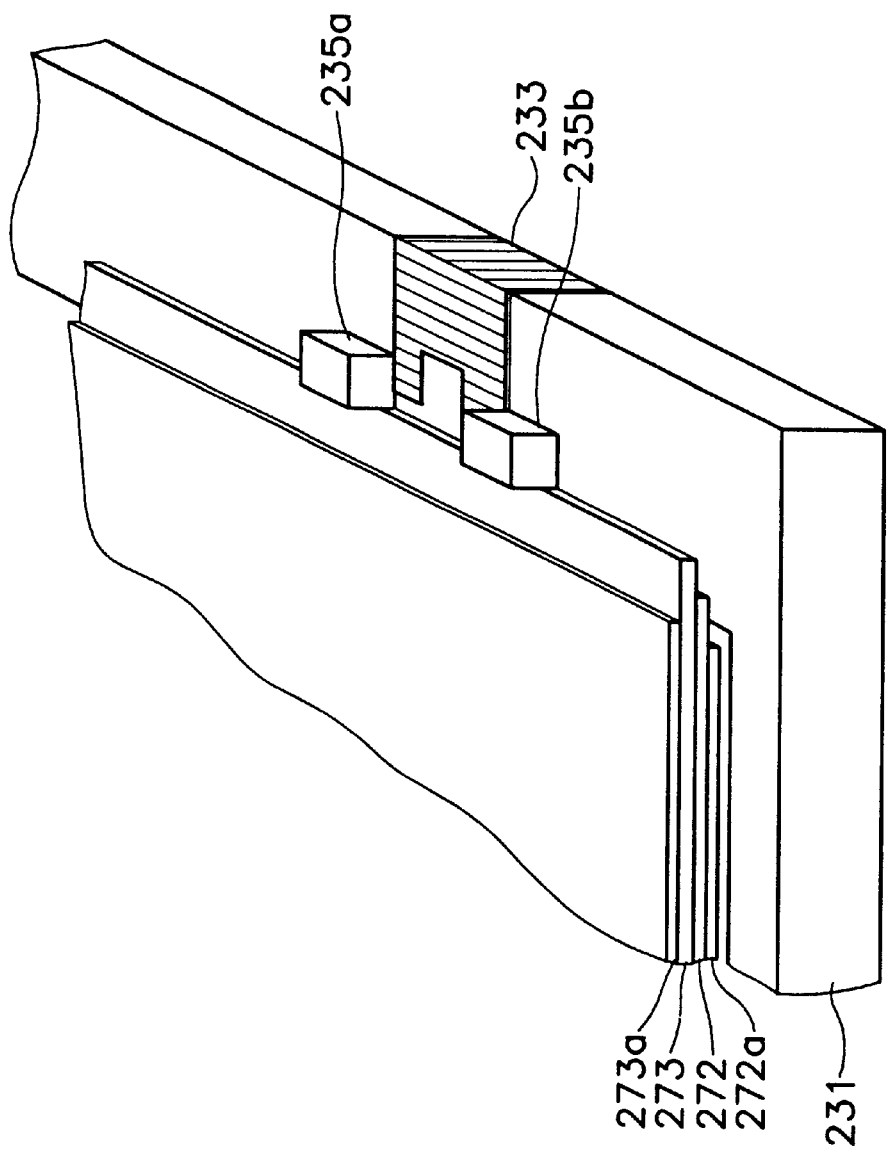

FIGS. 16, 17, and 18 are views showing an example of the mold frame 231 on which a plurality of guide projections 235 are formed.

Referring to FIG. 16, first and second guide projections 235*a* and 235*b* are formed on the upper surface of the one end of the mold frame 231 so as to prevent the grounding clip 233 from making electrical contact with the liquid crystal display panel 271. Third and fourth guide projections 235*c* and 235*d* are formed on the upper surface of the other end opposite to one end of the mold frame 231. The grounding clip 233 is combined to one end of the mold frame 231 so as to ground the printed circuit board 276 to the top chassis 240, as shown in FIG. 16.

Referring to FIGS. 17 and 18, the grounding clip 233 having a shape of a letter C in a sectional view, is combined to and encloses one end of the mold frame 231 on which the first and second guide projections 235*a* and 235*b* are formed. The portion of the grounding clip 233 bent toward the rear surface of the mold frame 231 makes contact with the data side printed circuit board 276. The display unit 270 is fixed to the mold frame 231 by means of the top chassis 240 that is faced towards and combined with the mold frame 231. A sidewall of the top chassis 240 makes contact with the grounding clip 233 at a side of the mold frame 231 so as to be electrically connected with the printed circuit board 276.

As shown by reference symbols W1 and W2 in FIG. 17, the gap W1 between the first and second guide projections 235*a* and 235*b* and the liquid crystal display panel 271 is narrower than the gap W2 between the grounding clip 233 and the liquid crystal display panel 271. When the guide projection 235 is adjacent to the grounding clip 233 on one end of the mold frame 231 and makes closer contact with the liquid crystal display panel 271 than when the grounding clip 233 makes contact with the liquid crystal display panel 271, it is possible to prevent the grounding clip 233 from deforming even though the mold frame 231 is bent by the force applied thereto as described with reference to FIGS. 6, 7, 8, and 9. In other words, when the forces P1 and P2 are continuously applied to the mold frame 231, the liquid crystal display panel 271 firstly makes contact with the first, second, third and fourth guide projections 235*a*, 235*b*, 235*c* and 235*d*, respectively, before making contact with the grounding clip 233. The guide projection 235 can prevent the grounding clip 233 from making contact with the thin film transistor board 272 or the color filter board 273 of the liquid crystal display panel 271.

According to the liquid crystal display device as described above, the grounding clip is combined with one end of the mold frame in order to ground the printed circuit board, which is bent toward and mounted on the rear surface of the mold frame, to the top chassis. The guide projection is formed on the upper surface of the one end of the mold frame to be adjacent to the grounding clip. The gap between the guide projection and the liquid crystal display panel received in the mold frame is narrower than the gap between the grounding clip and the liquid crystal display panel.

Accordingly, even though the mold frame becomes bent by the force applied thereto, the liquid crystal display panel firstly makes contact with the guide projection and does not move toward the grounding clip as the movement of the liquid crystal display panel is restrained by the supporting force of the guide projection integrally formed on the mold frame. As a result, the grounding clip can be prevented from deformation and also from making electrical contact with the liquid crystal display panel.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display device, comprising:
    a display unit for displaying an image;
    a mold frame for receiving the display unit;
    a printed circuit board mounted on a rear surface of the mold frame, for controlling an operation of the display unit;
    a top chassis faced toward and combined with the mold frame, positioned to be opposite to the mold frame, for guiding a position of the display unit; and
    grounding means combined with a first end of the mold frame, for grounding the printed circuit board to the top chassis,
    wherein the mold frame includes a projection formed on an uppermost surface of the first end to which the grounding means is combined, in order to prevent the display unit from making electrical contact with the grounding means.

2. The liquid crystal display device of claim 1, wherein the grounding means is positioned to enclose the first end of the mold frame so as to extend from the uppermost surface of the first end on which the projection is formed to the printed circuit board.

3. The liquid crystal display device of claim 2, wherein a gap between the display unit and the projection is narrower than a gap between the display unit and the grounding means.

4. The liquid crystal display device of claim 1, further comprising a projection formed on an uppermost surface of a second end of the mold frame opposite to the first end of the mold frame.

5. The liquid crystal display device of claim 4, wherein at least one projection is formed on the uppermost surfaces of both first and second ends of the mold frame.

6. The liquid crystal display device of claim 4, wherein the projection on the uppermost surface of the second end of the mold frame holds the position of the display unit with respect to the mold frame so as to prevent a movement of the display unit.

7. The liquid crystal display device of claim 1, wherein the grounding means has a thru-hole formed at a portion corresponding to the projection.

8. The liquid crystal display device of claim 7, wherein the grounding means is combined with the mold frame by insertion of the projection into the thru-hole of the grounding means.

9. The liquid crystal display device of claim 8, wherein a gap between the display unit and the grounding means is narrower than a gap between the projection and the display unit.

10. The liquid crystal display device of claim 1, wherein the grounding means has a recessed region formed at a portion corresponding to the projection, with an opening directed toward the display unit.

11. The liquid crystal display device of claim 10, wherein the grounding means is combined with the mold frame by insertion of the projection into the recessed region.

12. A liquid crystal display device, comprising:

a display unit for displaying an image;

a mold frame for receiving the display unit;

a printed circuit board mounted on a rear surface of the mold frame, for controlling an operation of the display unit;

a top chassis combined with the mold frame, positioned to be opposite to the mold frame, for guiding a position of the display unit; and grounding means combined with a first end of the mold frame, for grounding the printed circuit board to the top chassis, wherein the mold frame includes a projection formed on an upper surface of the first end to which the grounding means is combined, in order to prevent the display unit from making electrical contact with the grounding means, and the grounding means is positioned to enclose the first end of the mold frame so as to extend from the upper surface of the first end on which the projection is formed to the printed circuit board, and a gap between the display unit and the projection is narrower than a gap between the display unit and the grounding means.

* * * * *